(12) United States Patent
Mate et al.

(10) Patent No.: US 7,467,504 B2
(45) Date of Patent: Dec. 23, 2008

(54) PACKAGING SYSTEM FOR SPLIT PACKAGE ASSEMBLY

(75) Inventors: Matthew M. Mate, Forest Lake, MN (US); Thomas E. Dellwo, Maple Grove, MN (US); David W. O'Brien, Blaine, MN (US); David F. Ackley, Stacy, MN (US); Daniel D. Schroeder, Stacy, MN (US); Kevin A. Nelson, Stillwater, MN (US); Peter N. Fox, Prescott, WI (US)

(73) Assignee: Delkor Systems, Inc., Circle Pines, MN (US)

( * ) Notice: Subject to any disclaimer, the term of this patent is extended or adjusted under 35 U.S.C. 154(b) by 0 days.

(21) Appl. No.: 11/526,222

(22) Filed: Sep. 22, 2006

(65) Prior Publication Data

US 2007/0068121 A1    Mar. 29, 2007

Related U.S. Application Data

(60) Provisional application No. 60/720,293, filed on Sep. 23, 2005.

(51) Int. Cl.
*B65B 35/36* (2006.01)
*B65D 73/00* (2006.01)

(52) U.S. Cl. .................... 53/537; 53/543; 53/247; 53/251; 206/432; 206/460

(58) Field of Classification Search .......... 53/543, 53/247, 537, 251, 389.1; 206/432, 460
See application file for complete search history.

(56) References Cited

U.S. PATENT DOCUMENTS

| | | | | |
|---|---|---|---|---|
| 3,209,923 A * | 10/1965 | Bargel et al. | ............... | 198/432 |
| 3,555,770 A * | 1/1971 | Rowekamp | ............... | 53/495 |
| 3,600,872 A * | 8/1971 | Sharpnack | ............... | 206/432 |
| 3,601,951 A * | 8/1971 | Bargel et al. | ............... | 53/497 |
| 3,834,115 A * | 9/1974 | Johnson et al. | ............... | 53/55 |
| 3,929,234 A * | 12/1975 | Warren | ............... | 414/737 |
| 4,387,808 A * | 6/1983 | Dornbusch | ............... | 206/432 |
| 4,457,121 A * | 7/1984 | Johnson et al. | ............... | 53/56 |
| 5,060,455 A * | 10/1991 | Schmeisser | ............... | 53/448 |
| 5,257,888 A * | 11/1993 | Kronseder | ............... | 414/416.06 |
| 5,313,764 A * | 5/1994 | Kronseder | ............... | 53/247 |
| 5,512,124 A * | 4/1996 | Hansen | ............... | 156/334 |

(Continued)

FOREIGN PATENT DOCUMENTS

EP    0251032    1/1988

(Continued)

OTHER PUBLICATIONS

U.S. Appl. No. 60/720,293, filed Sep. 23, 2005, Fox et al.

*Primary Examiner*—Stephen F Gerrity
(74) *Attorney, Agent, or Firm*—Vidas, Arrett & Steinkraus

(57) ABSTRACT

A system and methods of use for assembling packages has one or more conveyors for advancing one or more product flavors into an accumulation of product units. At an accumulation area the accumulated product units are separated into a subset of pack units by a pack splitter which are then deposited onto an indexing conveyor. The pack units may be supported by a substrate. The pack units are advanced along the indexing conveyor for final package assembly.

12 Claims, 15 Drawing Sheets

U.S. PATENT DOCUMENTS

| | | | |
|---|---|---|---|
| 5,765,336 A * | 6/1998 | Neagle et al. | 53/201 |
| 5,810,150 A | 9/1998 | Martin et al. | 198/397 |
| 5,887,717 A | 3/1999 | Anderson et al. | 206/460 |
| 5,927,053 A * | 7/1999 | Donovan et al. | 53/543 |
| 5,943,844 A | 8/1999 | Wilhelm et al. | 53/442 |
| 6,022,947 A * | 2/2000 | Frihart et al. | 530/212 |
| 6,105,756 A | 8/2000 | Fenlon | 198/835 |
| 6,182,422 B1 | 2/2001 | Andersen et al. | 53/442 |
| 6,499,596 B1 | 12/2002 | Andersen et al. | 206/427 |
| 6,588,594 B2 | 7/2003 | Andersen et al. | 206/497 |
| 2005/0139502 A1 | 6/2005 | Andersen et al. | 206/427 |
| 2005/0167314 A1 | 8/2005 | Andersen et al. | 206/460 |

FOREIGN PATENT DOCUMENTS

| | | |
|---|---|---|
| WO | WO 99/59873 | 11/1999 |

* cited by examiner

PACKAGING SYSTEM FOR SPLIT PACKAGE ASSEMBLY

CROSS-REFERENCE TO RELATED APPLICATIONS

This Application claims priority from U.S. Application No. 60/720,293, filed on Sep. 23, 2005, the entire contents of which is hereby incorporated by reference.

STATEMENT REGARDING FEDERALLY SPONSORED RESEARCH

Not Applicable

FIELD OF THE INVENTION

In some embodiments this invention relates to high speed, product accumulation, and packaging systems and their methods of use. Some embodiments are directed to systems wherein multiple groups of a predetermined number of product are separated and transferred from a greater number of accumulated product, and then subsequently packaged together at a high speed using at least two pick-up heads.

BACKGROUND OF THE INVENTION

Package loading systems wherein a plurality of product or product containers are accumulated and then separated and/or transferred into a predetermined number for containment within a package assembly are known.

Such systems may utilize one or more conveyors, collators, transfer stations, etc., in order to organize and assembly package assemblies with a desired number of products therein.

For example: U.S. Pat. No. 5,943,844 is directed to a packaging machine used to wrap and package food products; U.S. Pat. No. 5,810,150 is directed to a collator for a food product packaging machine and its method of use; U.S. Pat. No. 6,105,756 is directed to a conveyor and converger suitable for use in a production line. The entire contents of each reference cited above is incorporated herein by reference.

Several factors limit the efficiency, speed, and general performance of such systems, such as, for example, the frictional interface between the individual product units and the various system surfaces particularly those that are moving, such as conveyors. Other limiting factors may include the shape of the product units, the desired configuration of the end package, the number of product units to be contained within the package, the variety of flavors or types of product to be contained within a given package, etc.

In light of the above, there is a need to provide a packaging system capable of accumulating, sorting and/or separating, transferring, and packaging a plurality of product units into distinct packages suitable for wholesale or retail display, at extremely high speeds. Desirably a system should be capable of efficiently organizing and packaging a high number product units regardless of their shape or size.

The present invention is directed to various embodiments of a system and it methods of use which meets such a need.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All U.S. patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In at least one embodiment the invention is directed to a high speed product package system which has a relatively small foot print for the speed at which it is capable of processing, particularly wherein the product units have a tapered shape, such as that typical of many food product containers.

In at least one embodiment, the invention is directed to a product packaging system which comprises at least one first conveyor, which conveys a plurality of product units from a product unit source to an accumulation area, and subsequently separates the product units into groups or pack units, which are eventually packaged for retail and/or wholesale display.

Pack units contain a set number of product units. The number of units in a pack unit may be based on a variety of factors including the type of pick-up heads used to transfer the product units from the accumulation area and the pattern of products in the accumulation area, etc.

In at least one embodiment for example, a pack unit may comprise 6 product units organized in two rows of three, or three rows of two, depending on the desired orientation of the pack unit on the system. Pack units may have any number of product units organized according to any pattern or configuration desired.

Pack unit are transferred from the accumulation area to an indexing conveyor or bed wherein a predetermined number of pack units are placed adjacent to a flight bar on the indexing conveyor. The flight bars act provide a spacing distance between each "flight" or group of pack units. In at least one embodiment for example the flight bars are at least 12, 14 or 16 inches apart. The distance between flight bars will depend on the size or length of the pack units as they are lined up on the indexing conveyor, the optional use of adhesive and its open time, the desired packaging speed, etc.

The pack units are transferred by a pack splitter which has at least two pick-up heads for engaging the pack units on the accumulating area, transferring the pack units over an indexing conveyor or bed, and then depositing the pack units on the indexing conveyor according to a predetermined pattern. The manner in which the pack units are placed on the indexing bed and the organization of the pack units may be aided by the presence of the flight bars which separate the in-line pack units on the indexing conveyor.

In some embodiments adjacent each flight bar is positioned one or more substrates such as a pad, box, carton or tray upon which each pack unit may be deposited. In at least one embodiment the substrate includes an adhesive which is placed on the substrate to engage each product unit of a given pack unit placed thereon. The adhesive may be any type of adhesive having at least some measurable open time. In at least one embodiment the adhesive is an EVA hot melt adhesive with an open time of no more than about 60 seconds. In some embodiments the open time is about 0.5 seconds to about 5 seconds.

Once the pack units are properly positioned on the indexing conveyor they may be advanced and/or reoriented into a wrapping mechanism which wraps each pack unit in a wrapping film or membrane. The wrapping film may be any type of packaging film including shrink wrap materials. In at least one embodiment the film is at least partially constructed of polyolefin.

In some embodiments multiple conveyors each having one or more lanes may be utilized to allow product units of different, types, configurations or "flavors" to be advanced into the accumulation area in a substantially uniform alternating pattern.

In at least one embodiment in order to minimize the foot print of the system, at least a portion of one of the conveyors is positioned above the other conveyor.

In some embodiments, prior to entering the accumulation area product units may first enter a staging area. The product units are retained in the staging area until a sufficient number of product units are accumulated to allow the formation of the desired pattern of pack units. When a desired number and/or pattern of product units have accumulated in the staging area a sensor, such as an optical sensor for example, opens a gate or other barrier to allow the product units to advance into the accumulation area for organization and separation into pack units.

These and other embodiments which characterize the invention are pointed out with particularity in the claims annexed hereto and forming a part hereof. However, for further understanding of the invention, its advantages and objectives obtained by its use, reference can be made to the drawings which form a further part hereof and the accompanying descriptive matter, in which there is illustrated and described a embodiments of the invention.

BRIEF DESCRIPTION OF THE SEVERAL VIEWS OF THE DRAWING(S)

A detailed description of the invention is hereafter described with specific reference being made to the drawings.

DETAILED DESCRIPTION OF THE INVENTION

Figure 1:
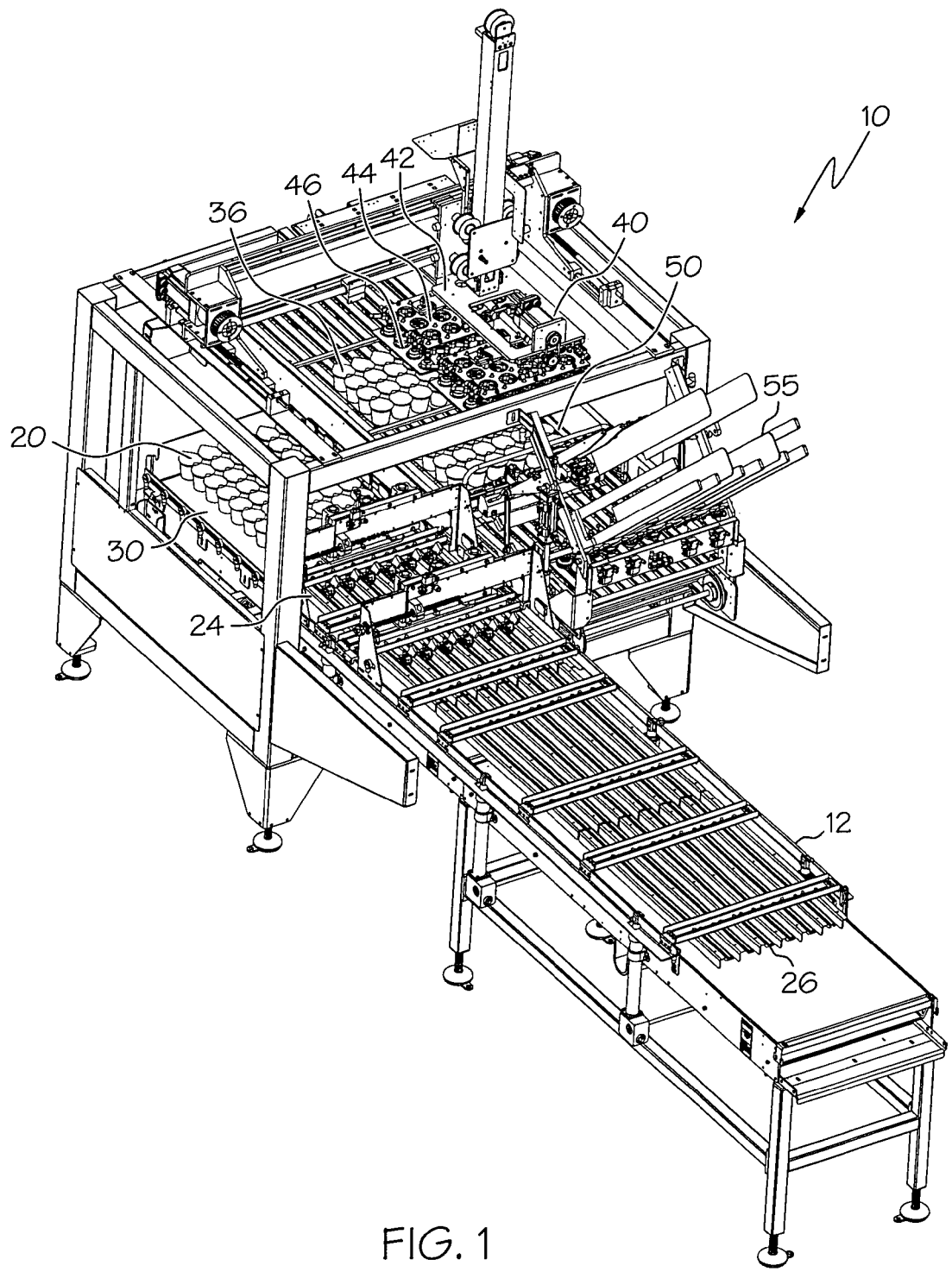
FIG. 1 is a front perspective view of an embodiment of the invention.
Figure 2:
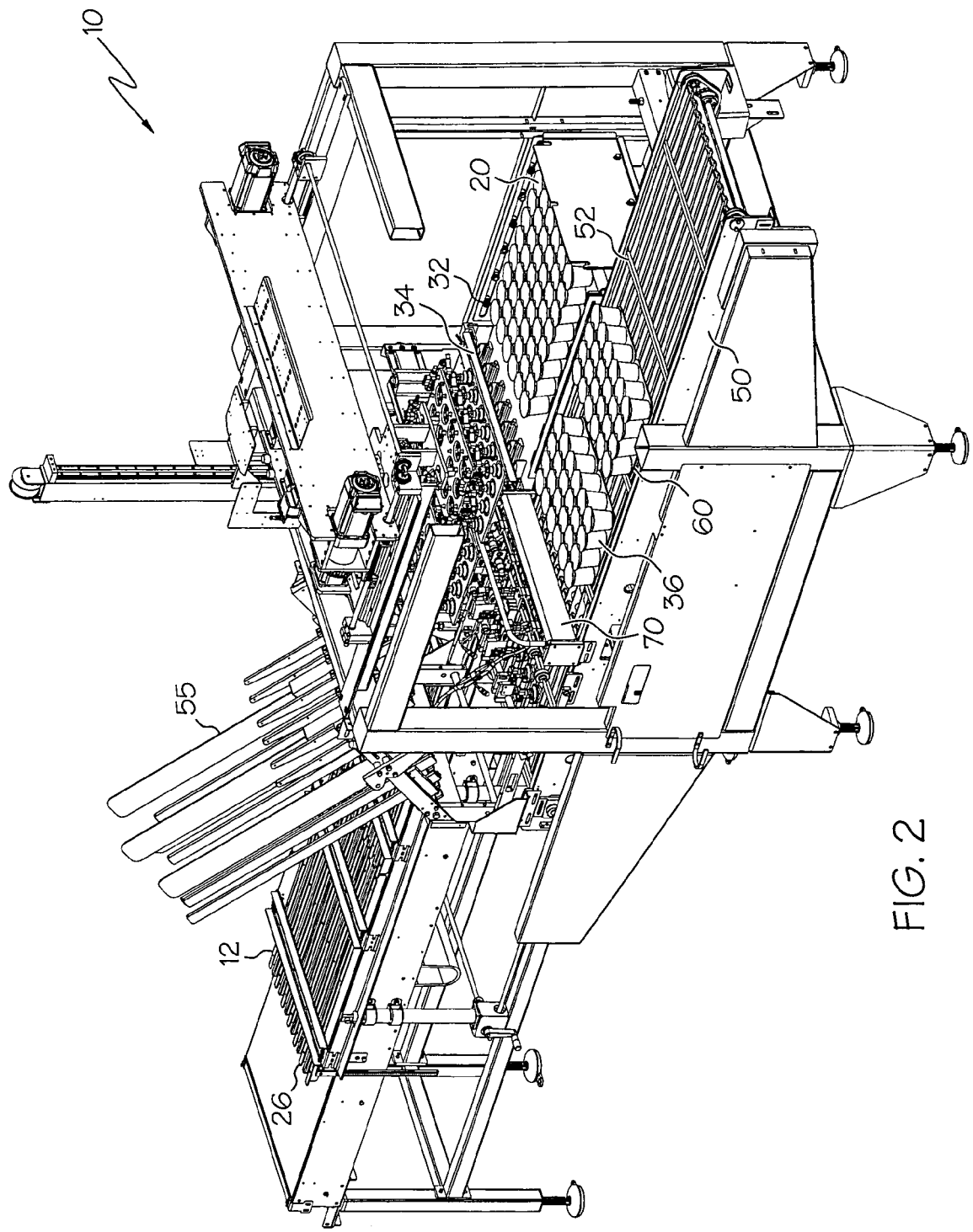
FIG. 2 is a rear perspective view of the embodiment of the invention shown in FIG. 1
Figure 3:
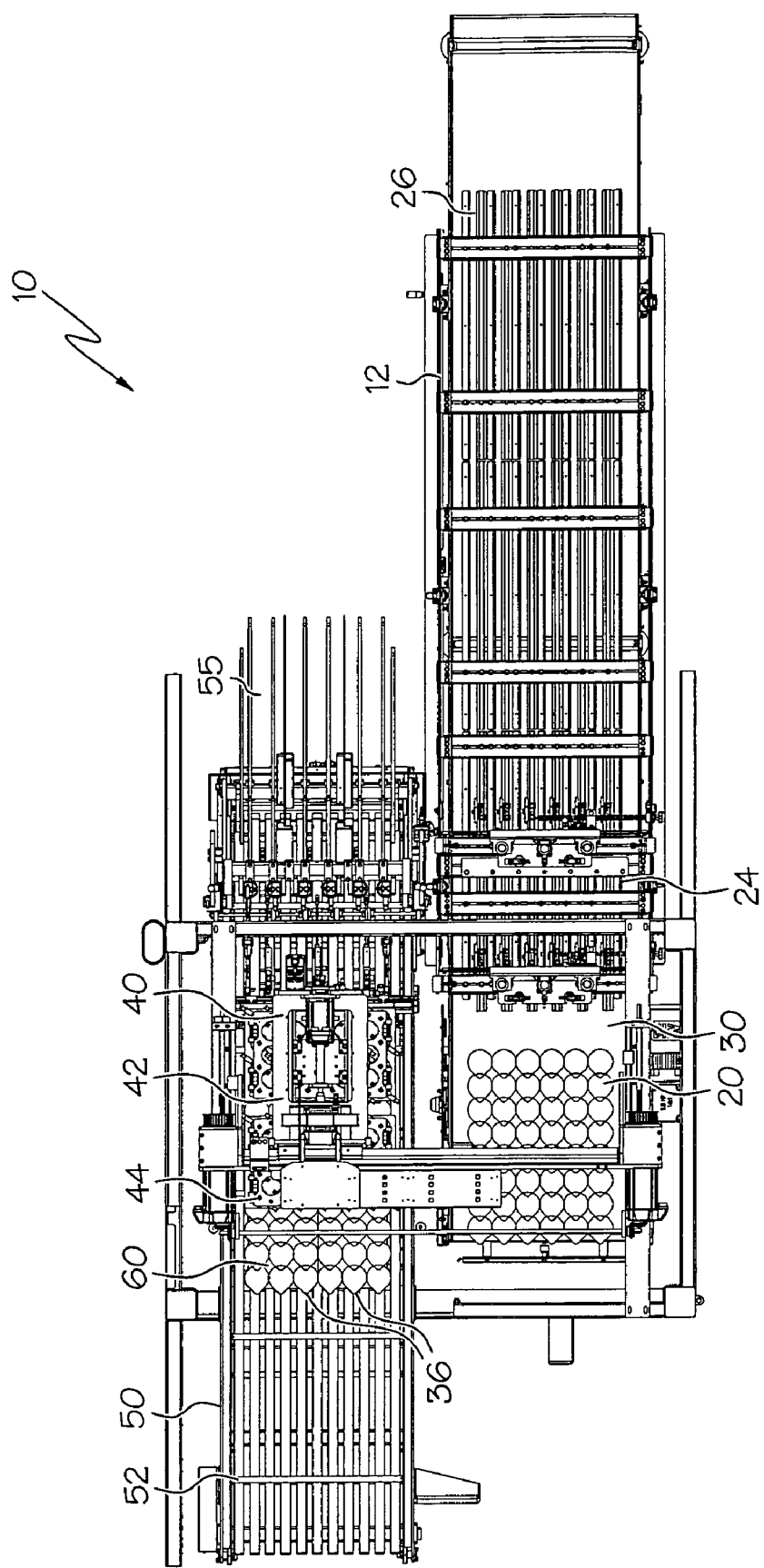
FIG. 3 is a top down view of the embodiment of the invention shown in FIGS. 1-2.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Depicted in the figures are various aspects of the invention. Elements depicted in one figure may be combined with, and/or substituted for, elements depicted in another figure as desired.

As indicated above the present invention is directed to a number of embodiments. An example of at least one embodiment of the invention is depicted in FIG. 1.

In the embodiments shown in FIGS. 1-9 a packaging system 10 is shown wherein at least one first conveyor 12 is configured to convey a plurality of product units 20 from a supply 22 (shown in FIGS. 14-15) of product units to an infeed or staging area 24.

In the embodiments shown in FIGS. 1-9, the system 10 is provided with a conveyor 12 having six infeed lanes 26. Embodiments of the system however have any number of infeed lanes as desired.

The conveyor 12 advances the product units 20 into the staging area 24 where the product units are allowed to initially accumulate. The system 10 is configured with a controller 100 (depicted in the block diagram of FIG. 15) that is programmed to determine what quantity of product units are to accumulate in the staging area 24 before the accumulated number of units 20 are allowed to advance through the staging area 24 and into an accumulation area 30. For example in the embodiment shown in FIGS. 1-3, and in the embodiment shown in FIGS. 4-5 the system 10 accumulates forty-eight product units or containers 20, in the staging area 24 which are then allowed to pass into the accumulation area 30. In another embodiment shown in FIGS. 6-7 the system 10 accumulates thirty-six product units 20 within the staging area 24 are accumulated. In yet another embodiment of the invention shown in FIGS. 8-9 the system 10 accumulates twenty-four product units 20 within the staging area 24 before allowing the assembled product units to advance in to the accumulation area 30. It should be understood that in various embodiments of the invention, system 10 is configured to accumulate any number of product units 20 desired.

Figure 15:
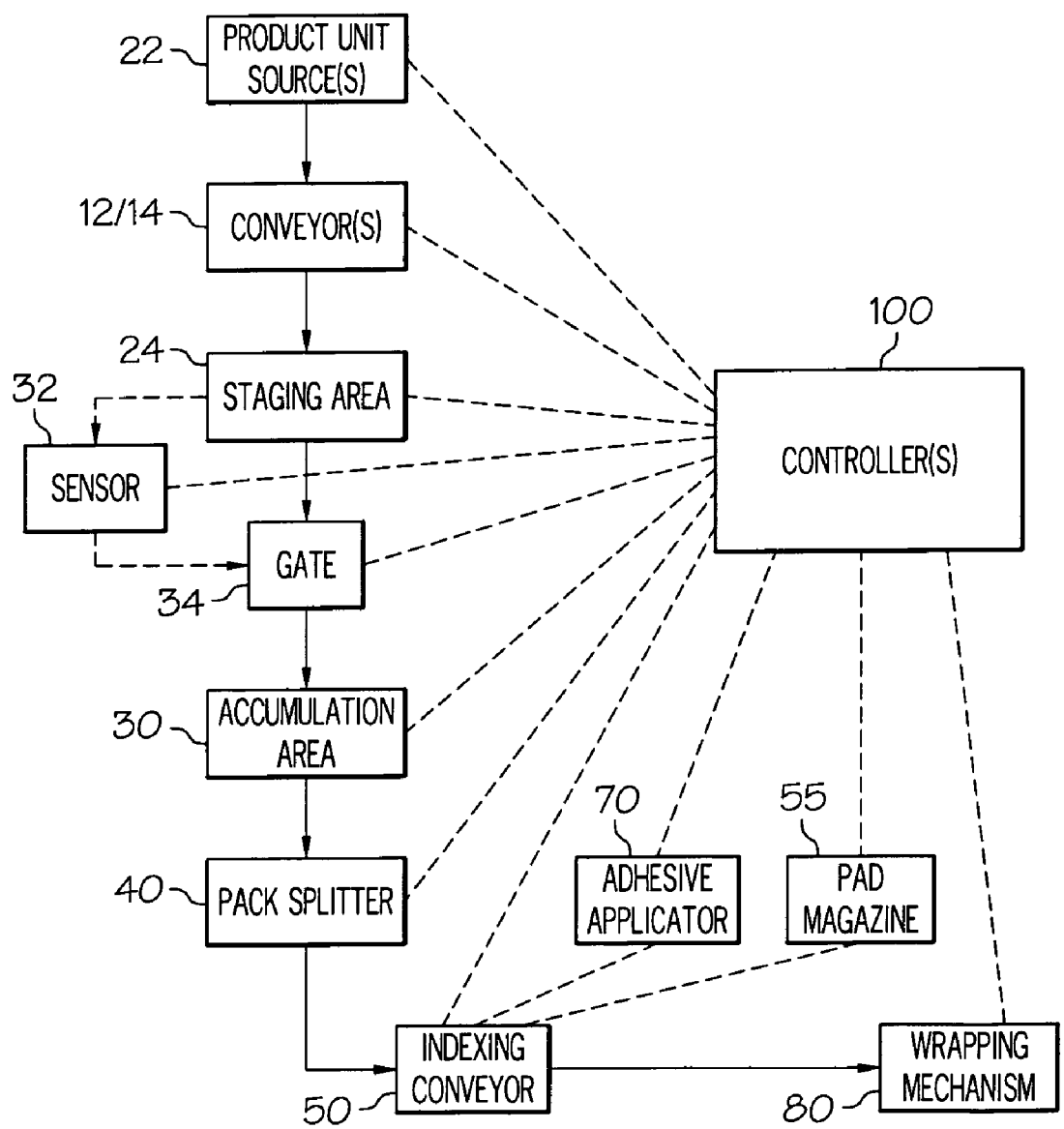
FIG. 15 is a block diagram illustrating the relationship of some components of an embodiment of the invention.

As is depicted in FIG. 15, system 10 is provided with various mechanisms for determining that the proper or desired number of product units have accumulated in the staging area before being advanced to the accumulation area. For example, in some embodiments the control 100 is operatively engaged to a sensor 32 (also visible in FIG. 4), such as a weight sensor, optical sensor or other detection device, which detects when the desired number of product units have entered the staging area 24. The controller 100 is also operatively engaged to a gate 34 or similar device (also visible in FIG. 4), which is opened upon receiving a signal from the sensor 32 and/or controller 100 that the desired number of product units are present. When the gate 34 is opened the conveyor 12 will convey the accumulated product units into the accumulation area 30 in the manner described.

Once the desired number of accumulated product units are advanced into the accumulation area 30, the product units are positioned for pick-up and transfer to an indexing conveyer 50.

In various embodiments, and as best shown in the top down views of FIGS. 3, 5, 7 and 9, the product units 20 are arranged in the accumulation area 30 in a clearly defined pattern, which may be easily separated into individual pack units 36.

For example:

In the embodiments shown in FIGS. 1-3 and 4-5 for example, forty-eight product units 20 are present in the accumulation area 30 in a six by eight pattern. In the embodiment shown in FIGS. 1-3 the controller organizes the pattern into four pack units 36 of twelve product units 20 each, whereas in the embodiment shown in FIGS. 4-5 the pattern is organized into two pack units 36 of twenty-four product units 20 each.

Figure 6:
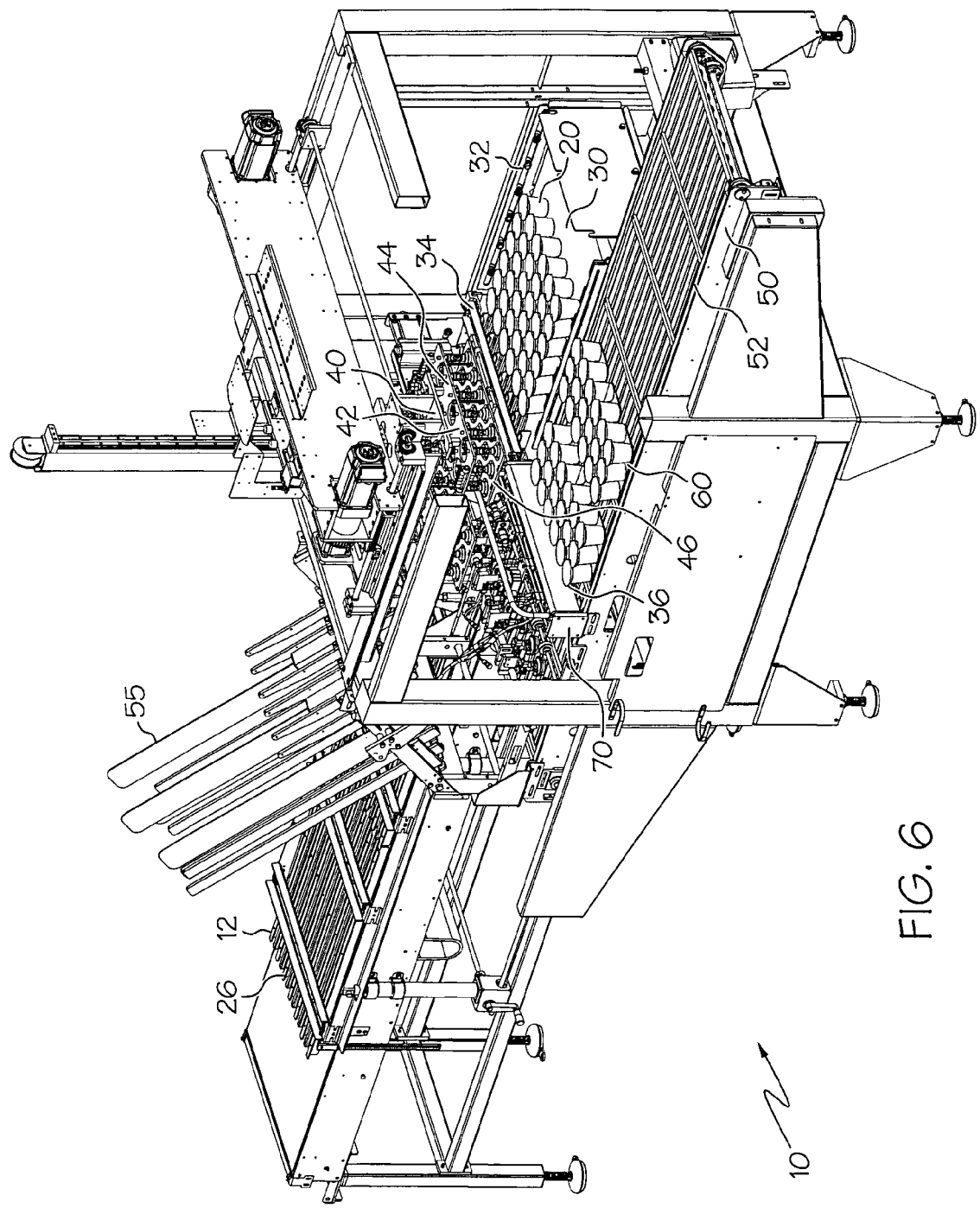
FIG. 6 is a rear perspective view of an embodiment of the invention.
Figure 7:
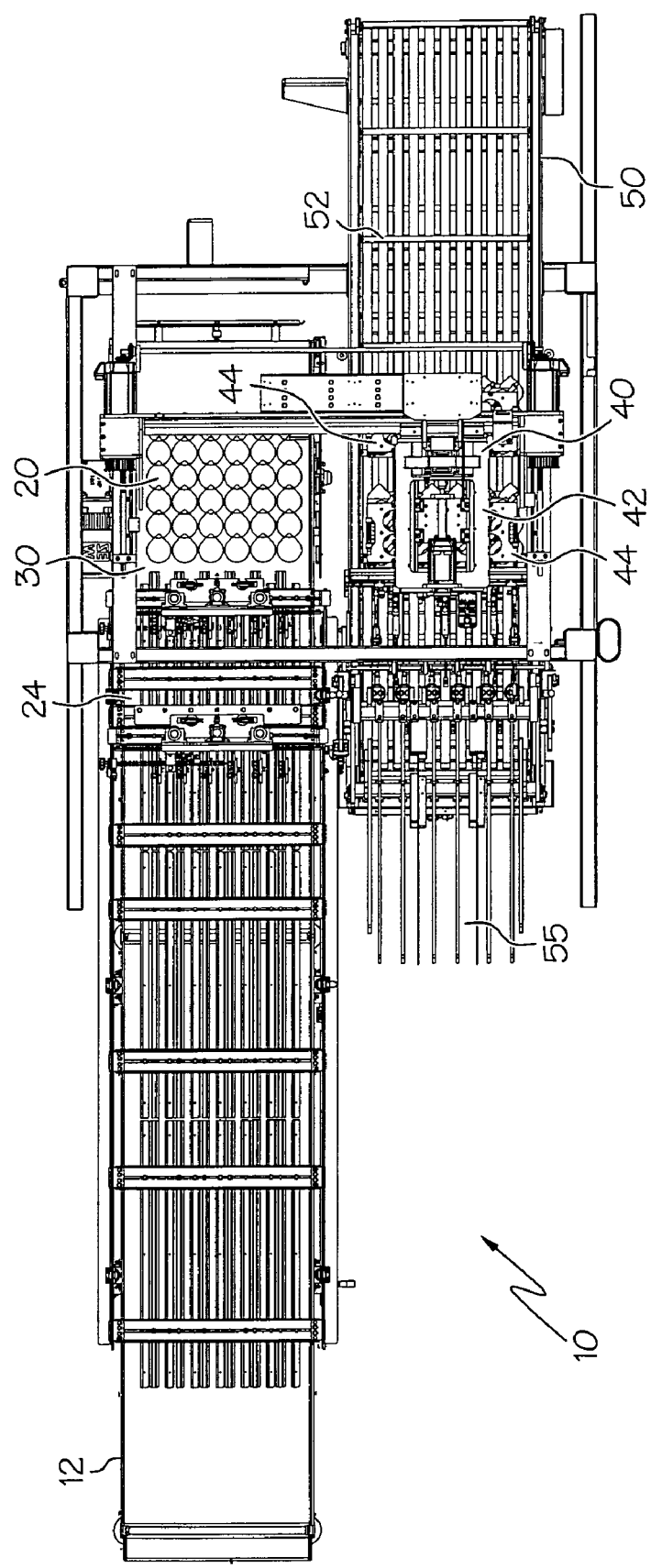
FIG. 7 is a top down view of the embodiment of the invention shown in FIG. 6.

In the embodiment depicted in FIGS. 6-7, thirty-six product units 20 are arranged in the accumulation area 30 in a six by six pattern, which will by organized further into six pack units 36 of six product units 20 in each.

Figure 8:
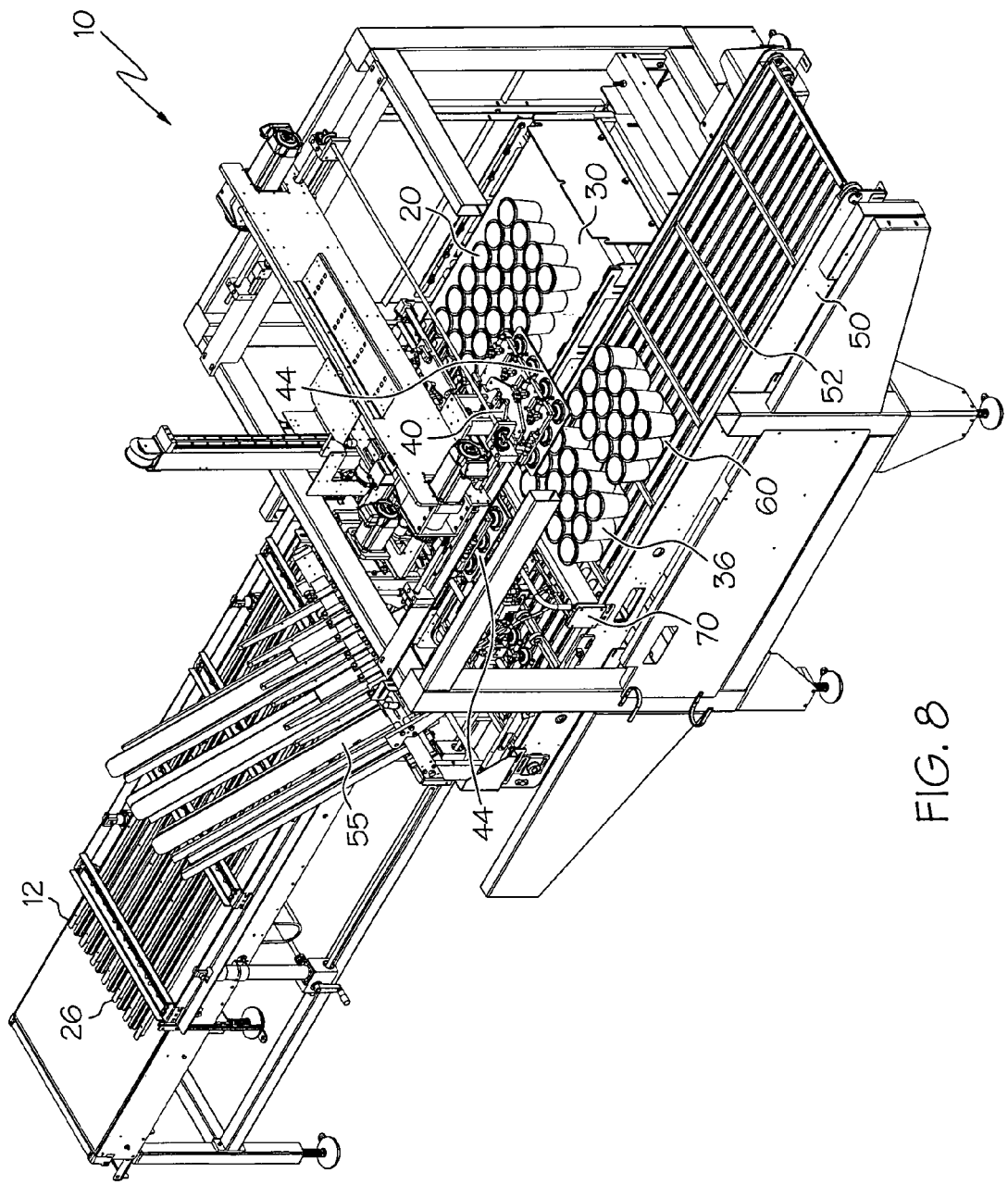
FIG. 8 is a rear perspective view of an embodiment of the invention.
Figure 9:
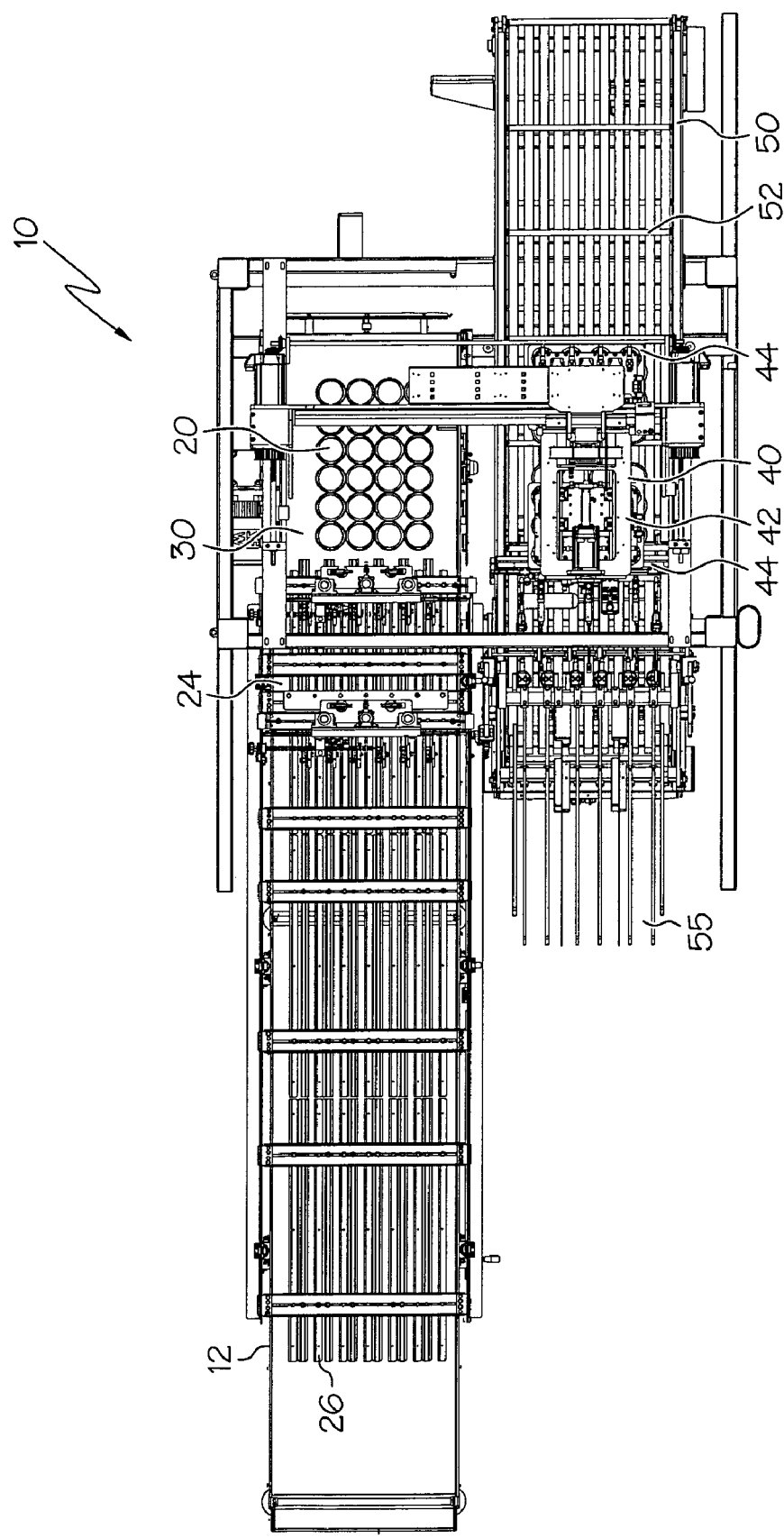
FIG. 9 is a top down view of the embodiment of the invention shown in FIG. 8.
Figure 10:
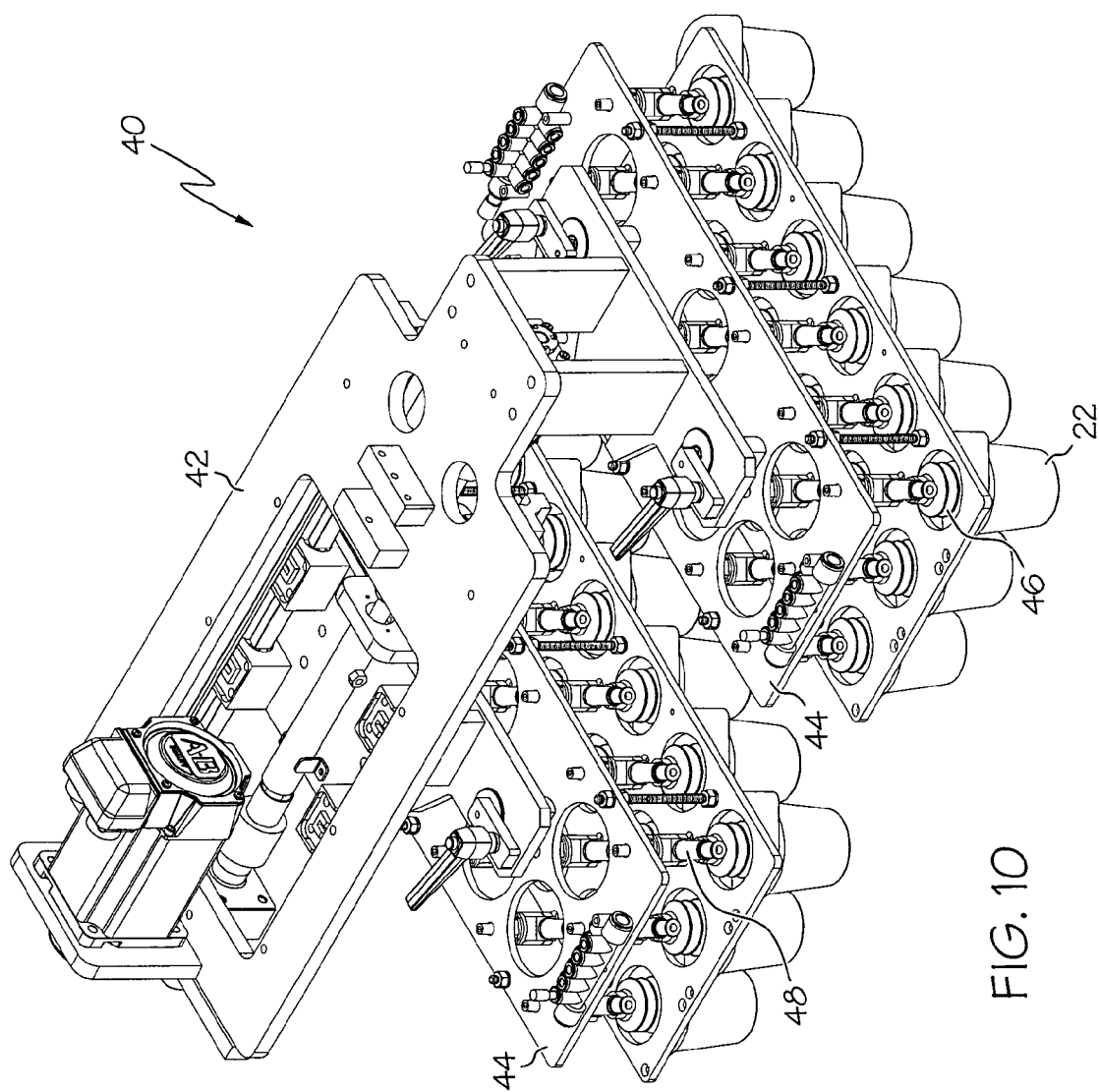
FIG. 10 is a perspective view of an example split head assembly.
Figure 11:
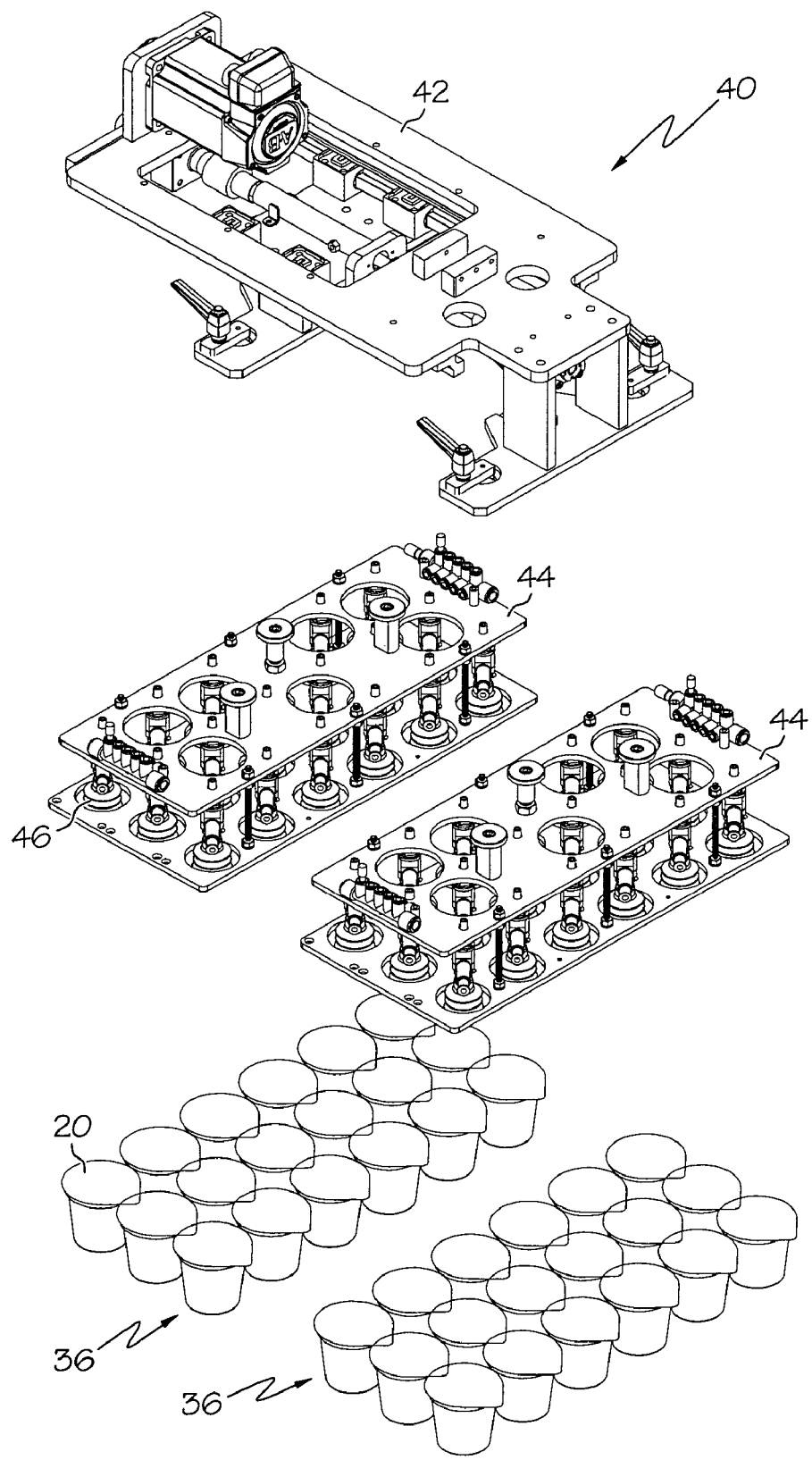
FIG. 11 is an exploded view of the split head assembly shown in FIG. 10
Figure 12:
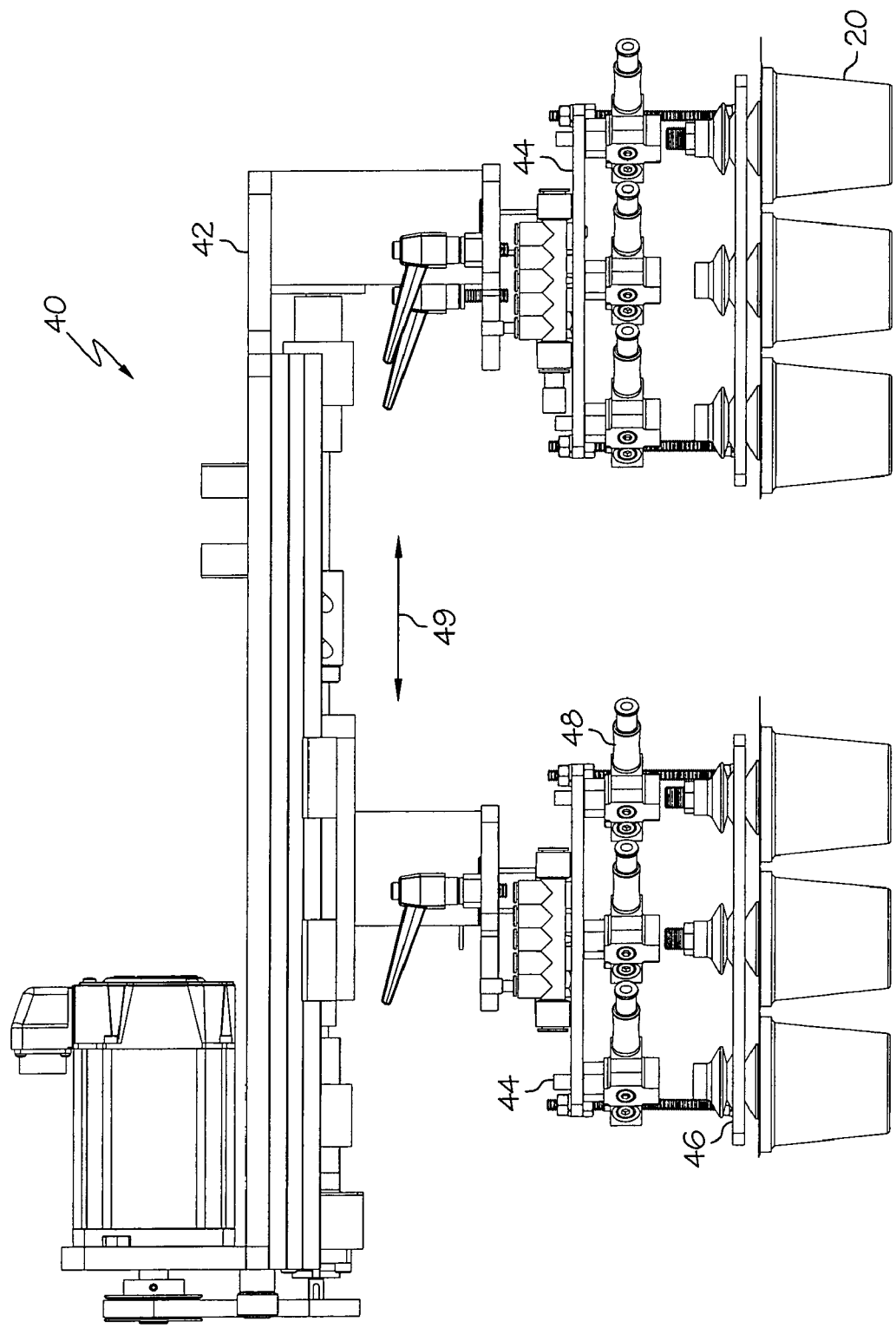
FIG. 12 is a side view of the split head assembly shown in FIGS. 10-11.
Figure 13:
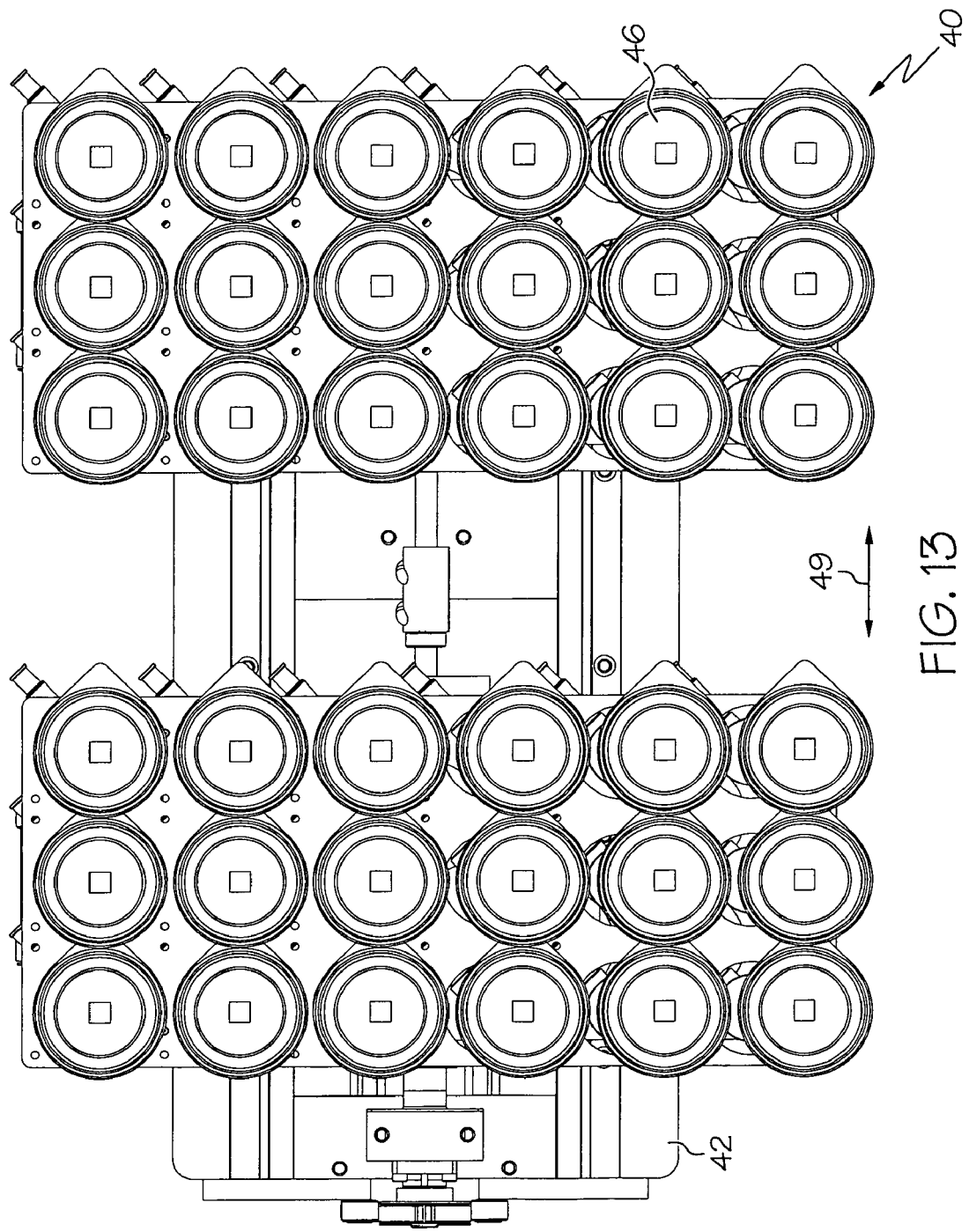
FIG. 13 is a top up view of the split head assembly shown in FIGS. 10-12.

In the embodiment depicted in FIGS. 8-9, twenty-four product units 20 are arranged in the accumulation area 30 in a four by six pattern, which will be further split into four pack units 36 of six product units 20 in each.

It should be clear from the examples presented above and depicted in FIGS. 1-9 that the system 10 is configurable to accommodate virtually any number and arrangement of product units 20, which can be further arranged in any number or desired configuration of pack units 36. The system 10 is configured to accumulate virtually any number of product units which are then divided and separated into any divisible number of pack units. Pack units may themselves be transferred and conveyed singly in-line, in-lines in rows of multiple pack units, in multiple product levels, etc. in any other manner or configuration desired.

While the controller 100 determines the timing and number of product units 20 which are moved into the accumulation area 30, the actual division of product units 20 into individual pack units 36 is accomplished by transferring the appropriate number of product units from the accumulation area 30 to the indexing conveyer 50 by a at least one split head assembly or pack splitter 40. The exemplary pack splitter 40 shown in the embodiment of FIGS. 6-7 is shown in various views in FIGS. 10-13.

As shown in FIGS. 10-13 pack splitter 40 comprises a platform or arm 42 to which at least two (or more) pick-up heads 44 are moveably engaged. Each pick-up head 44 is comprised of a plurality of griping members 46 each of which are configured to grip an individual product unit 20. The manner in which the griping members 46 are organized on the pick-up head determines, in-part, the pattern of the pack units 36.

In the embodiment shown in FIGS. 10-13 the gripping members 46 "grip" or engage the individual product units by application of a vacuum. The vacuum is formed by a vacuum generator 48. The vacuum applied to each griping member 46 provides sufficient negative pressure to allow each gripping member 46 to engage a product unit 20 resting in the accumulation area 30 and lift the product unit out of the accumulation area 30 and over the indexing conveyer 50. When the controller turns the vacuum generator off, the product units 20 are released onto the indexing conveyer in accordance with the pattern defined by the pick-up heads 44.

The pick-up heads however are a dynamic transfer mechanism which may alter their relative position during transfer to allow different spacing of product units and pack units. For example, as illustrated in FIGS. 1-9, when the pick-up heads 44 are in position over the product units 20 within the accumulation area 30 the pick-up heads 44 will be close together, or immediately adjacent one another as desired, in order to engage the relatively packed together product units 20. This 'closed' positioning allows both pick-up heads 44 to grip all of the product units of the tightly organized group within the accumulation area 30 simultaneously and in a single event.

As the product units are moved over and onto the indexing conveyer 50, the pick-up heads 44 will move apart from one another (as illustrated by arrow 49 in FIGS. 12-13), such as by servo, hydraulic, mechanical or other actuation mechanism (s) 47. When the desired spacing is achieved above the indexing conveyer 50, the griping members 46 release the product units 20 to deposit them on the indexing conveyer 50 in the predetermined pattern of pack units 36 as previously described.

In at least one embodiment the spacing of the pick-up heads 44 at the point of release correspond substantially to the spacing between flight bars 52 positioned on the indexing conveyer 50. Flight bars 52 provide a spacing between each pack unit or rows of pack units on the indexing conveyer 50.

In some embodiments, adjacent to each flight bar 52 is positioned one or more substrates 60. Each substrate acts as the base of what will eventually be a final package assembly which the system 10 is configured to provide. Some example of substrates as well as package assemblies of the type system 10 is capable of producing are shown and/or described in U.S. Pat. No. 5,887,717, U.S. Pat. No. 6,182,422, U.S. Pat. No. 6,499,596, U.S. Pat. No. 6,588,594, U.S. Published Application 2005-0139502-A1, and U.S. Published Application 2005-0167314-A1; the entire content of each being incorporated herein by reference.

In some embodiments the substrates 60 are pads, cartons, trays, open boxes, etc. In at least one embodiment the substrate 60 is a pad or tray of corrugated cardboard. Pack units 36 are shown deposited on some example substrates in FIGS. 2, 4, 6 and 8. Substrates are fed onto the indexing conveyer 50 from a pad magazine 55.

In at least one embodiment, each substrate 60 includes a glue or adhesive (not shown) which may be entirely or selectively applied to the substrate so that at least some, or all, of the product units 20 deposited on the substrate 60 are adhesively engaged to the substrate 60. Adhesive is applied to the substrates by an adhesive applicator 70 depicted in FIG. 15. The adhesive applicator is configured to allow for the application of adhesive in any number of patterns or configurations, such as by placing individual spots or "dots" of adhesive, each of which correspond to the eventual position of an individual product unit on the substrate. In some embodiments one or more lines or other patterns of adhesive are applied to the substrate corresponding to a row, column or other pattern of product units.

The adhesive may be any type of adhesive having some open time wherein the adhesive is sufficiently fluid or tacky to allow the product units to be readily adhered to the substrate. The adhesive may be temporary adhesive, frangible adhesive, removable adhesive, time release adhesive, biodegradable adhesive, and any combination thereof.

In at least one embodiment the adhesive is an EVA hot melt adhesive.

In at least one embodiment the adhesive has an open time of no more than about 60 seconds. In some embodiments the adhesive has an open time of no more than about 15 seconds. In at least one embodiment the adhesive has an open time of about 0.5 to about 5 seconds.

The spacing of the substrates 60 provided by the flight bars 52 (and speed of the indexing conveyor 50 relative to the speed of the initial conveyor 12) is particularly significant in embodiments wherein the substrates 60 include the adhesive. In such embodiments the spacing of the flight bars may utilized to ensure adequate time for transferring the pack units 36 onto the substrates within the open time of the adhesive. For example as the adhesive is applied to the substrates, before a pack unit is deposited, a first row of adhesive applied substrates 60 will be advancing along the indexing conveyor while a next row of substrates has yet to or is having adhesive applied thereto. This delay in adhesive application may be about 1 to about 5 seconds. Appropriate spacing the flight bars, conveyance rates, and properly timing the transfer of pack units on to the substrates the system ensures that the adhesive on both rows (and all subsequent rows) of substrates remains open at least until the pack units are deposited thereon in the manner shown in FIGS. 1-9 and described in detail above.

The speed of the conveyor 12 and indexing conveyor 50 may be different from one another and is independently controlled via controller 100. The relative speeds of the conveyors may be changed in order to accommodate a wide range of adhesive open times and to ensure proper timing of pack unit transfer from accumulation area and deposition onto substrates. In at least one embodiment the indexing conveyor 50 advances at a slower speed than the first conveyor 12.

After the pack units 36 have been deposited onto the substrates 60, they are advanced along the indexing conveyor 50. While in some embodiments the pack-units 36 and their substrates 60 may be considered to be completed package assemblies, in some embodiments however, it will be necessary to include additional packaging aspect to complete the final packaging of the product units. For example in some embodiments a top pad may be placed on top of the assembled pack unit. Some examples of appropriate top pads are described in the references previously cited and incorporated above.

In some embodiments it is desirable to wrap the pack units and their associated substrates and/or top pads in a plastic film or membrane. In some embodiments the film is a shrink wrap. In some embodiments the film is a direct encapsulating layer of material. In at least one embodiment the film is at least partially constructed of polyolefin material. In at least some embodiments the final wrapped package is similar to those described in one or more of the incorporated references cited above.

Figure 14:
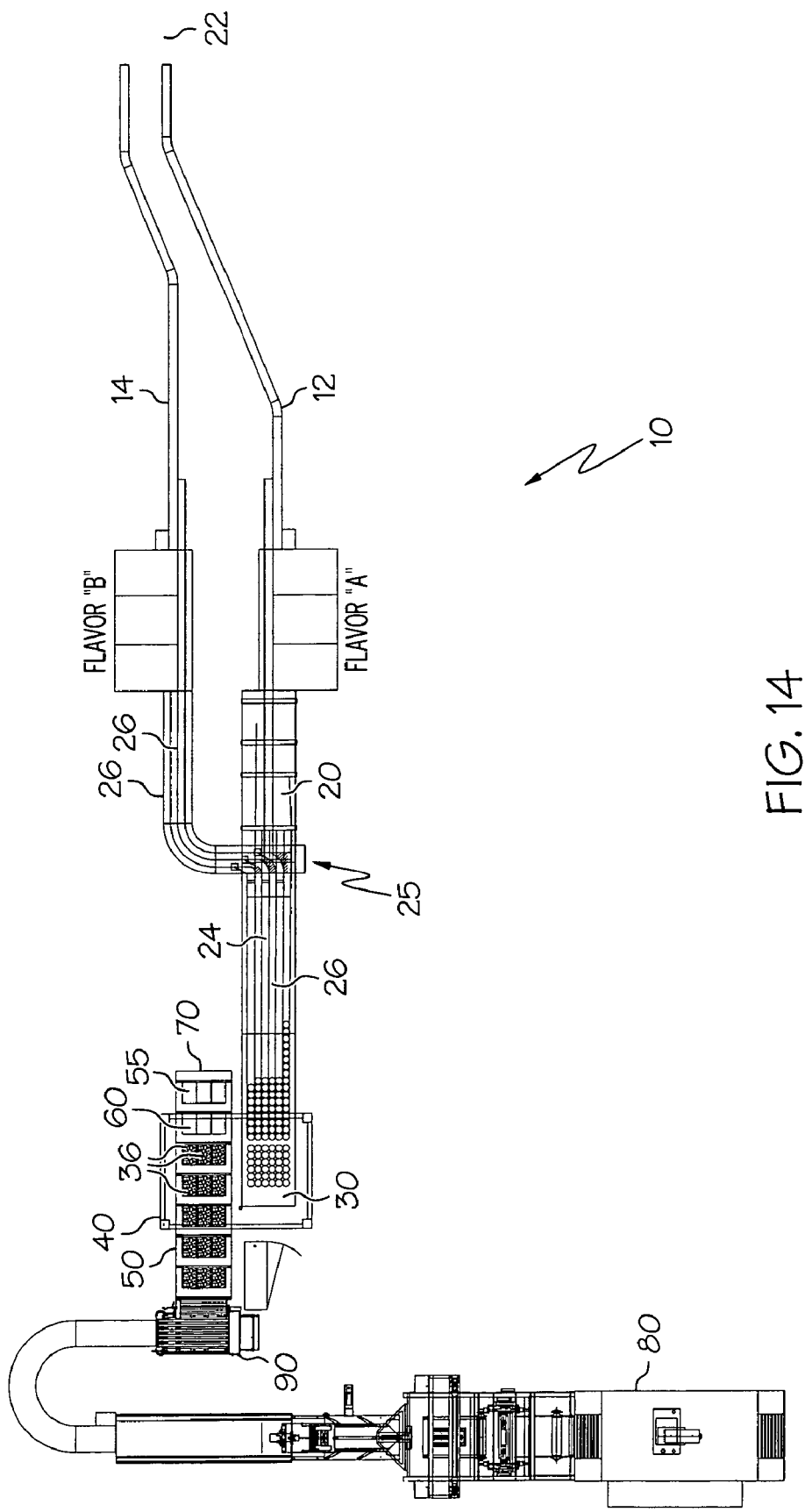
FIG. 14 is a schematic view of an embodiment of the invention.

In the embodiment shown in FIG. 14, a plastic film is applied to the pack units by a wrapping mechanism 80. As the pack units 36 are advanced along the indexing conveyor 50 they are repositioned or reoriented as appropriate to ensure that they have the dimensional characteristics to pass into and through the wrapping mechanism 80. In some embodiments reorientation of the pack units 36 is not necessary as the individual units are already assembled on the indexing conveyor 50 in a manner appropriate to pass through the wrapping mechanism. If this is not the case however any of a variety of reorientation mechanisms 90 (such as a secondary conveyance mechanism which changes the direction of the pack units by a desired angle, such as about 90 degrees) may be utilized by the system 10 to orient the pack units appropriately.

Figure 4:
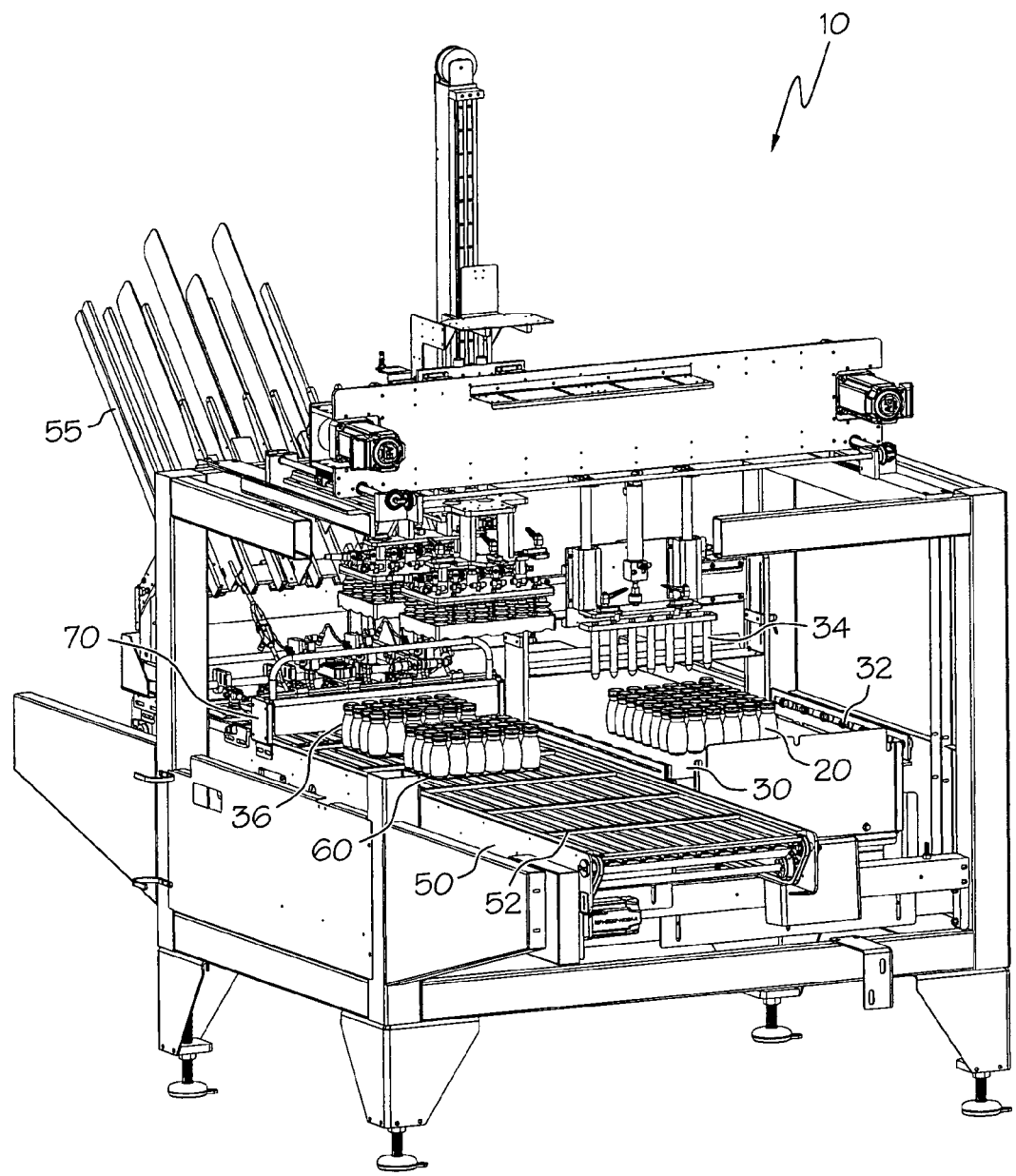
FIG. 4 is a rear perspective view of an embodiment of the invention.
Figure 5:
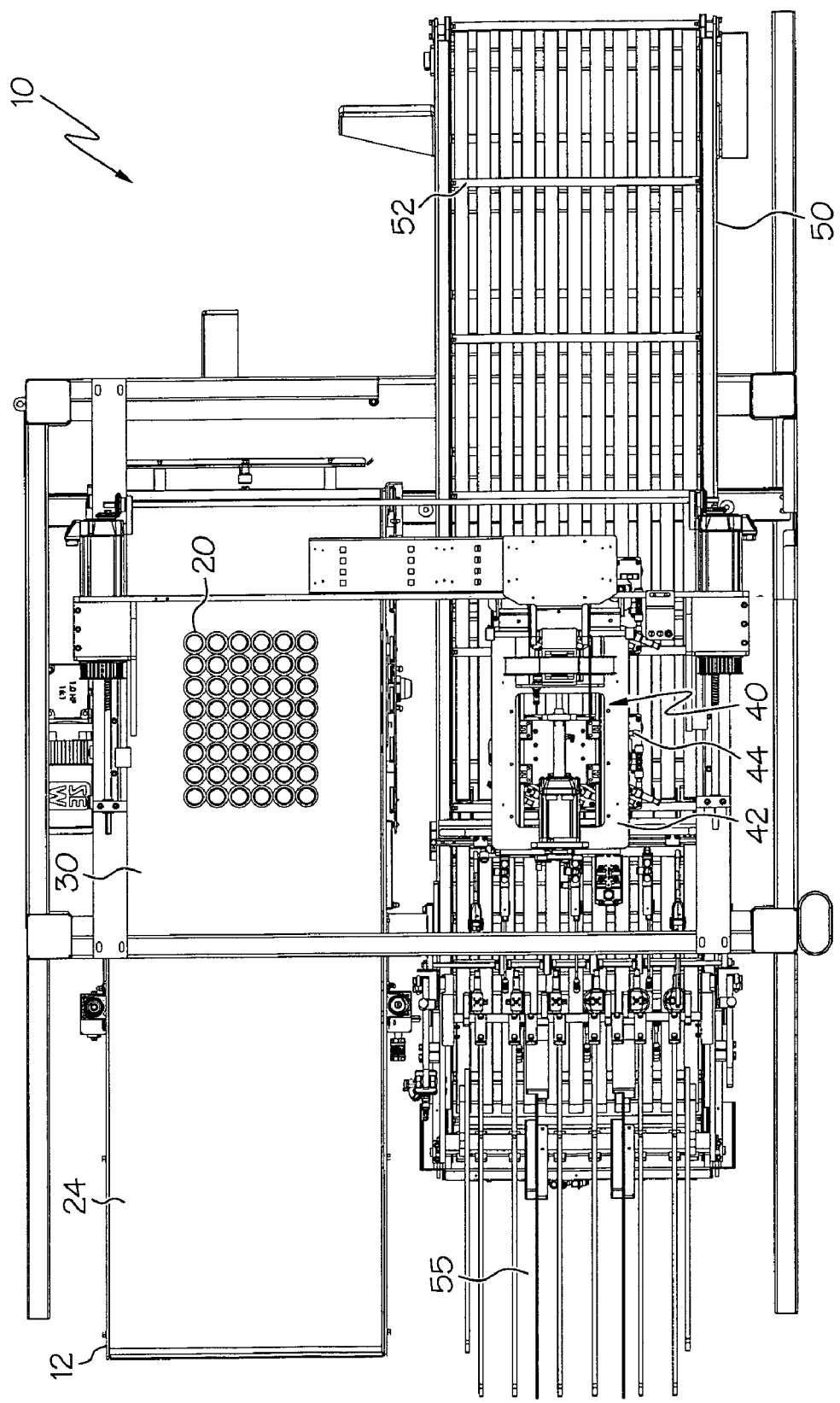
FIG. 5 is a top down view of the embodiment of the invention shown in FIG. 4.

As indicated above embodiments of the system 10 includes sensors, a controller or controllers, and other mechanisms to ensure that the system provides rapid and efficient package assembly. The embodiment shown in FIGS. 1-3 for example, is capable of assembling product units 20 into pack units 36 (via split head assembly 40), wherein the product units 20 are adhesively bonded (temporarily or otherwise) on substrates 60, and optionally wrapped via the wrapping mechanism 80 at a rate of about 580 product units per minute. The embodiment depicted in FIGS. 4-5 provides a packaging rate of about 600 product units per minute. The embodiment depicted in FIGS. 6-7 also provides a rate of about 580 product units per minute. The embodiment depicted in FIGS. 8-9 provides a rate of about 300 product units per minute.

It should be recognized by those familiar with packaging assemblies, and especially those familiar with packaging assemblies utilizing temporary and other forms of adhesives, that the embodiments presented herein and their corresponding packaging rates represent an substantial increase in packaging speed and efficiency over previous packaging assemblies.

While the use of the split head assembly 40 and other features described thus far provide for much of the improved efficiency described, other features of the present invention also play a role. For example, a feature that aids in stabilizing the product units as they advance along the initial conveyor 12 is a fairly low coefficient of friction between the individual product units 20 and the conveyor surface. In at least one embodiment the coefficient of friction is about 0.16. This coefficient may be achieved, in at least one embodiment, by providing product containers which are constructed substantially from PET (polyethylene terephthalate) or polypropylene and a conveyor surface constructed substantially of polypropylene. It should be understood that other materials may of course be used to provide a low coefficient of friction between the conveyor surface and the product units, and that the use of such materials is within the scope of the present invention.

Another aspect of the invention that, in at least some embodiments, is significant to the speed and efficiency of the system 10 is the shape of the individual product units 20 being processed. While product units having a substantially cylindrical, square (rectangular as well) and/or other shapes may be processed by system 10, product units having a substantially tapered configuration (wherein the top surface of the product unit has a greater area than a bottom surface or vice versa) are particularly suited for processing by the system 10 particularly in light of the high degree of control provided by the conveyor(s) as well as other control features previously described.

As to the feature of the controller or controllers 100 which function to control and regulate various aspects of the system 10, the controllers may be embodied in a wide variety of forms including, computers (and their programs), regulators, automated gauges, sensors, etc. The controller or controllers 100 may also be an inherent feature of each component which are in cooperative communication or operation with one another as represented in FIG. 15.

Additional feature of the invention is that in some embodiments the system 10 may employ multiple first conveyors, such as a "flavor A" conveyor 12 and a "flavor B" conveyor 14. Such a multiple conveyor system is illustrated in FIG. 14. In some embodiments additional flavor conveyors may be utilized.

Multiple initial conveyors allow different, types configurations or "flavors" of product units to be advanced through the system 10 simultaneously. While the conveyors 12, 14, etc, may be positioned relative to one another in any of a variety of configurations, in the embodiment shown, the "flavor B" conveyor 14 is actually positioned above the "flavor A"

conveyor 12. The conveyors 12 and 14 converge at the staging area 24 wherein the product units from the "flavor B" conveyor are gravity fed down into this common area.

In some embodiments, the system 10 will include one or more infeed lanes 26 on each conveyor and/or the staging area 24 in order organize and maintain separation of the rows of different flavor product units 20. In the embodiment shown for example, conveyors 12 and 14 converge at separator 25 wherein the rows of different products are organized so that every other row leading intro the staging area 24 contains a different flavor of product unit 20.

The infeed lanes 26 may be defined by the conveyors themselves or a device or mechanism adjacent thereto. As mentioned above the system 10 may have any number of infeed lanes 26, dependant on the type of product, the number of product containers to be placed on each pad, etc.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

The invention claimed is:

1. A product packaging system comprising:
   a first conveyor, the first conveyor constructed and arranged to convey a plurality of product units along a conveyor surface, the product units being accumulated into a pattern of pack units, each pack unit comprising a set number of product units and having a length and a width;
   an indexing conveyor, the indexing conveyor being independent of the first conveyor, the indexing conveyor comprising a plurality of flight bars, each flight bar having an in-line separation distance at least as great as the length of a pack unit;
   a pack splitter having at least two pick-up heads, each pick-up head having a number of gripping members equal to the set number of product units, each pick-up head constructed and arranged to simultaneously transfer at least one pack unit from the conveyor surface to the indexing conveyor;
   a pad magazine, the pad magazine constructed and arranged to hold a plurality of substrates, the pad magazine further constructed and arranged to position each substrate onto the indexing conveyor, each pack unit being deposited on a single substrate by one of the pick-up heads; and
   an adhesive applicator for applying an adhesive to each of the substrates before the pack unit is deposited thereon, wherein the adhesive is an EVA hot melt adhesive having an open time of about 0.5 to about 5 seconds, and wherein the pack unit is deposited on the adhesive during the open time.

2. The system of claim 1 further comprising:
   a staging area, the first conveyor operatively extending into the staging area, the product units being advanced into the staging area by the first conveyor, the product units being retained in the staging area until a predetermined number of product units are accumulated in the staging area;
   an accumulation area, the accumulation area being operatively engaged to the staging area, the predetermined number of product units being advanced into the accumulation area from the staging area only after the predetermined number of product units have been accumulated in the staging area.

3. The system of claim 2 further comprising a gate, the gate separating the staging area and the accumulation area, the gate having an open position and a closed position, in the closed position the product units are retained in the staging area, in the open position the predetermined number of product units are passed through the gate from the staging area to the accumulation area.

4. The system of claim 3 further comprising at least one detection mechanism, the at least one detection mechanism operatively engaged to the gate, wherein when the at least one detection mechanism detects that the predetermined number of product units have accumulated in the staging area the gate is actuated from the closed position to the open position.

5. The system of claim 4 wherein the at least one detection mechanism is a visual detection mechanism.

6. The system of claim 1, further comprising at least one of said substrates being positioned between adjacent flight bars of said indexing conveyor.

7. The system of claim 6 wherein between the adjacent flight bars at least two substrates are positioned.

8. The system of claim 1 wherein the adhesive applicator is constructed and arranged to apply at least one type of adhesive is selected from at least one member of the group consisting of: temporary adhesives, frangible adhesives, removable adhesives, time release adhesives, biodegradable adhesives, and any combination thereof 9. The system of claim 1 wherein the first conveyor has a speed and the indexing conveyor has a speed, the speed of the indexing conveyor being slower than the speed of the first conveyor.

10. The system of claim 1 wherein the first conveyor has a first conveyor speed, the indexing conveyor has an indexing conveyor speed, the pack splitter has a range of motion and a speed of motion, and each pick-up head is actuatable between a first state wherein each pick-up head is engaged to the at least one pack unit and a second state wherein each pick-up head is free of the at least one pack unit;
   the system further comprising a controller, the controller constructed and arranged to control, the first conveyor speed, the indexing conveyor speed, the range of motion and the speed of motion of the pack splitter, and the actuation of each pick-up head.

11. The system of claim 1 further comprising a wrapping mechanism, the indexing conveyor extending into and through the wrapping mechanism, the wrapping mechanism comprising a mechanism for applying a packaging film to each pack unit.

12. The system of claim 11 having a packaging rate, the packaging rate being the time X in which the plurality of product units Y are passed from the first conveyor through the wrapping mechanism, where in X is about one minute and Y is at least 500 product units.

* * * * *